Aug. 17, 1943.  J. S. KOPAS  2,327,194
TESTING DEVICE
Filed April 24, 1941  2 Sheets-Sheet 1

INVENTOR.
JOSEPH S. KOPAS.
BY Woodling and Krost

Aug. 17, 1943.　　　　J. S. KOPAS　　　　2,327,194
TESTING DEVICE
Filed April 24, 1941　　　　2 Sheets-Sheet 2

INVENTOR.
JOSEPH S. KOPAS.
BY Woodling & Krost

Patented Aug. 17, 1943

2,327,194

UNITED STATES PATENT OFFICE 2,327,194

TESTING DEVICE

Joseph S. Kopas, Cleveland, Ohio

Application April 24, 1941, Serial No. 390,088

9 Claims. (Cl. 35—22)

My invention relates to testing devices for registering the aptitude of a person being examined.

In the determination of the degree of aptitude of a person it is known that the reactions of the person, called the examinee, to certain questions and problems presented to him reflect certain aptitudes or characteristics of the examinee. In the use of a pencil or pen and paper for testing an examinee, it has been found, in the case of many examinees, that his reactions have not been properly reflected in the answers given and a full and impartial analysis of the examinee's aptitude is difficult to determine by reason of external factors such as fear, nervousness and self-consciousness arising out of mental association of the pencil or pen and paper with past examinations or otherwise. Likewise, in the use of complicated machines and apparatus it has been difficult to obtain the full concentration of the examinee on the test being given and to obtain a proper recording of his reaction to the questions or problems presented.

Complex recording machines are moreover expensive, cumbersome and difficult to operate. Too often they require considerable training and instruction for their successful operation.

My testing apparatus is simple and economical in construction and yet gives an immediate and accurate registration of the reaction of the examinee to the questions or problems presented. The indications of the degree of aptitude are so arranged that the complete result is easily and quickly determinable. No training and very little preliminary instructions are necessary in the use of my apparatus. The external factors of the described fear, nervousness and self-consciousness are practically eliminated by reason of the simplicity of the structure, the form and arrangement of the parts and the psychological factors which tend to make the examinee accurately record his reactions with the use of my apparatus. The problems and questions are presented in an attractive manner and the manner in which the examinee records his reaction is such as to entice his interest and to encourage him to accurately record his reactions. Testing apparatus which does not accurately reflect the true aptitudes of the examinee without distortion or change by reason of external factors is of little value. The present apparatus herein disclosed does eliminate the force of external factors, creates a desire in the examinee to properly indicate his reactions to the questions or problems presented and the apparatus accurately, efficiently and conveniently records the indicated reactions to disclose the aptitude of the examinee.

It is an object of my invention to eliminate the defects and limitations of the prior testing devices and to provide an improved testing device producing results not heretofore obtainable.

Another object is the provision of a testing device of economical and efficient construction.

Another object is the provision of a testing device which induces the examinee to exert his best efforts toward a proper recording of his aptitude.

Other objects and a fuller understanding of my invention may be had by referring to the following figures of the drawings, in which:

Figure 8 is a view of the opposite side of the panel corresponding with the view of Figure 7;

Figure 9:
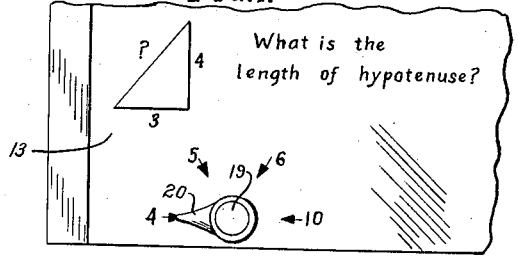
Figure 10:
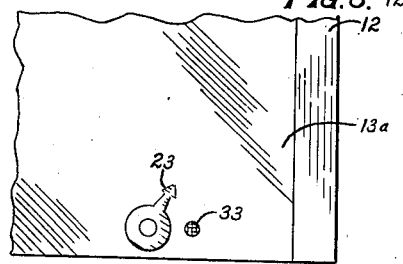

Figure 9 is another partial view of a panel embodying my invention and illustrates another type of question or problem presented and the manner of indicating the answer thereto; and Figure 10 is a view of the opposite side of the same panel and corresponding to the view of Figure 9 to show the corresponding translation of the selected answer to indicate a characteristic or aptitude of the examinee.

Figure 3:
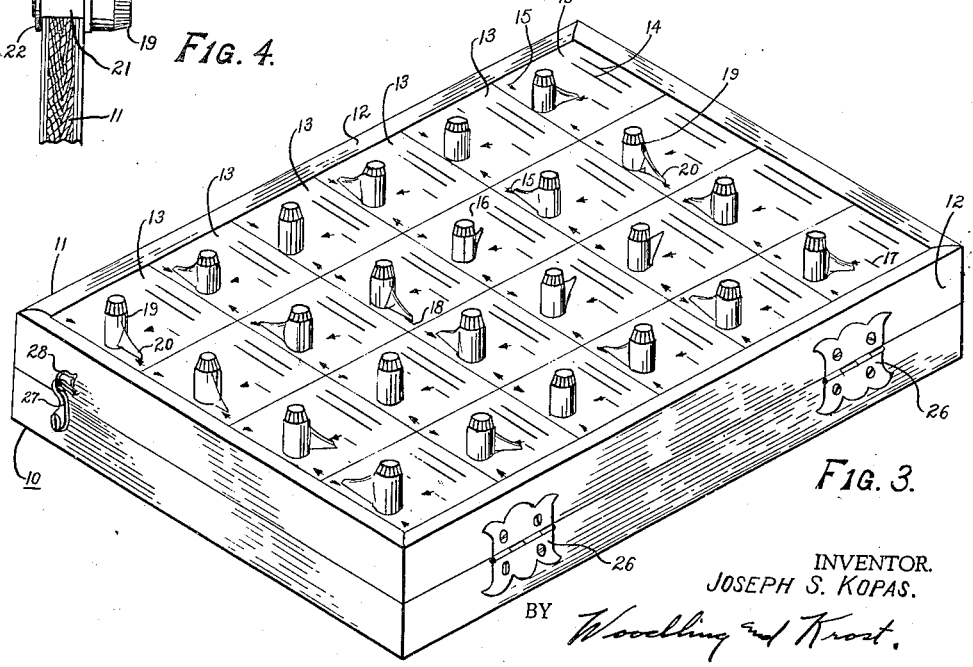
Figure 3 is a perspective view of a book of panels hinged together and arranged in closed position.

In the preferred embodiment of my testing apparatus the book of panels denoted generally by the reference characters 10 and 11 are joined together back to back as illustrated in Figure 3. Each panel has a frame 12 extending around its edges. Suitable hinges 26 screwed to the frames 12 hold the panels together in the manner of a book. A hook 27 secured to one of the frames 12 is adapted to catch in the eye member 28 of the other frame 12 to thus hold the panels together during the testing operation.

Each of the panels has opposite faces, one of the faces being observable to the examinee during the test and the other of the faces being not observable to the examinee during the test. The faces of the panels observable to the examinee are disposed upon the outside surfaces of the book shown in Figure 3 and the surfaces not observable to the examinee are disposed inwardly of the book shown in Figure 3 between the assembled panels.

Figure 1:
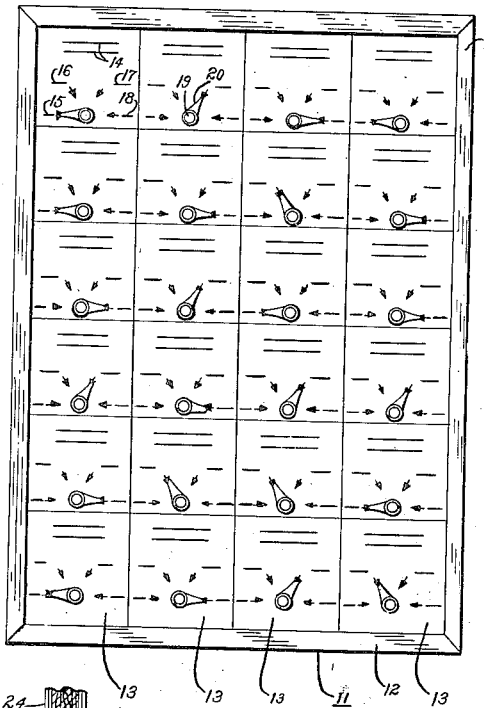
Figure 1 is a plan view of one of the panels of the book of panels embodied in my apparatus.
Figure 2:
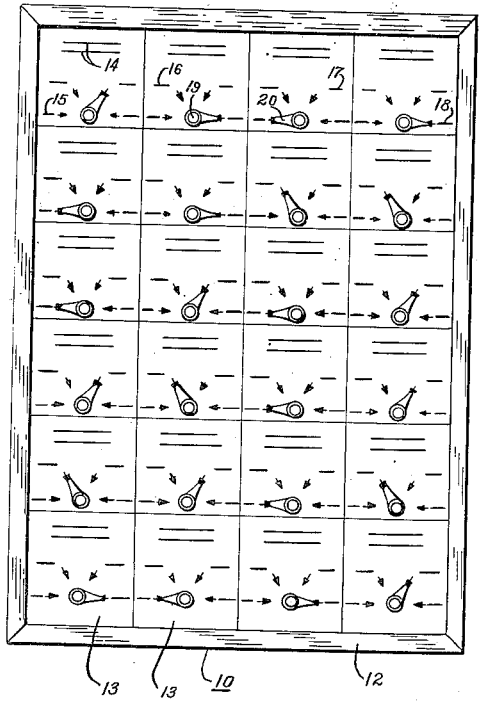
Figure 2 is a plan view of another panel of the book of panels embodying my invention, Figures 1 and 2 representing the outside or top and bottom surfaces of the closed book of panels shown in Figure 3.
Figure 4:
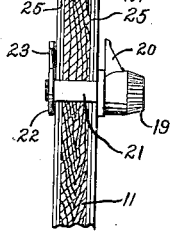
Figure 4 is an enlarged cross-sectional view taken through a portion of one of the panels of my apparatus and demonstrates the mounting of the indicating members through the panel.

Each panel is comprised of a wood base upon which is pasted or otherwise secured a paper sheet 25. A sheet of "Cellophane" or regenerated cellulose or other suitable transparent material 24 is placed over the outer surface of the sheets 25. Figure 4, being a cross-sectional view through one of the panels, illustrates the disposition of the sheets 25 and 24 on the opposite sides of the wood base.

The faces of the panels 11 and 12 are ruled off or marked into rectangles or local areas 13. Each area 13 on the face of the panel observable to the examinee has a corresponding area on the opposite face not observable to the examinee.

In each of the local areas 13 there is printed a suitable indicia 14 representing a question or problem presented to the examinee. The question or problem is, of course, different for each of the plurality of local areas. Also, within each local area there is a plurality of indicia 15, 16, 17 and 18 representing alternate answers or solutions to the presented question or problem. It is understood that the term "alternate answers" refers to a plurality of possible answers of which one may be selected by the examinee and is not limited necessarily to two alternate answers. The indicia 15, 16, 17 and 18 are arranged in the general outline of an arc in each local area 13. The indicia 14, 15, 16, 17 and 18 are printed or otherwise impressed upon the paper sheet 25 and are visible through the transparent sheet 24.

Mounted in each panel in juxtaposition to the indicia 15, 16, 17, and 18 of the local areas 13 is an indicating device. Each indicating device comprises a shaft 21 extending through a suitable opening or bore in the panel and extending from the face visible to the examinee to the face not visible to the examinee. Upon one end of the shaft 21 a knob or knurled head 19 is rigidly secured. An indicating pointer 20 extends out radially of the shaft 21 from the head 19. Secured to the opposite end of the shaft 21, a flat washer 22 having a pointer portion 23 extending therefrom is rigidly secured. The arrangement is such that the shaft 21 upon rotating in the bore in the panel causes the pointers 20 and 23 to simultaneously revolve therewith. Upon the turning of the knob 19 by the examinee to point the pointer portions 20 in one direction the pointer portion 23 simultaneously revolves to point a corresponding direction, but not necessarily the same direction. The pointing of the pointer portion 20 to one indicia always results in the pointing of the pointer portion 23 to a pre-determined indicia on the opposite face of the panel. While the examinee is able to observe the position of the pointer portion 20 he is unable to observe the position of the pointer portion 23 although the positioning of the pointer portion 23 is dependent upon the positioning of the pointer portion 20. The fit of the shaft 21 in the panel is quite snug so that the indicating device will readily stay in the position where it has been set by the turning of the knob 19. It has also been found that by making the fit fairly tight it requires some effort upon the part of the examinee to turn the knob 19 and he concentrates upon the effort of positioning the pointer to the indicia selected as his chosen answer and in the effort eliminates whatever nervousness, tension or self-consciousness which he might otherwise have in taking an examination.

Figure 5:
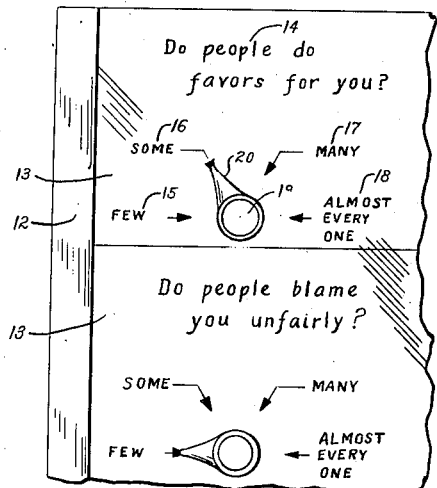
Figure 5 is a partial view of one side of my panel illustrating one type of question presented and the manner in which the selected answers are indicated.
Figure 6:
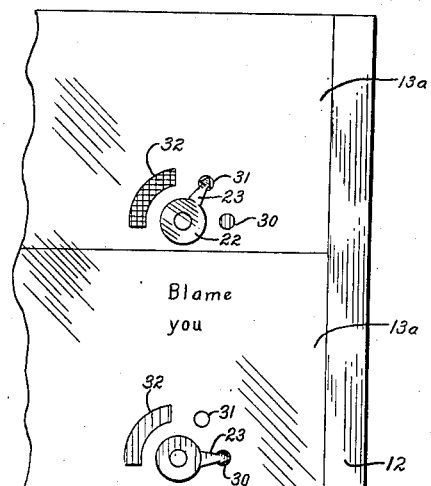
Figure 6 is a view of the opposite side of the panel corresponding to the view of Figure 5 and illustrates the manner in which the selected answers are translated to indicate the aptitude of the examinee.

Figures 5 to 10, inclusive, illustrate the manner in which different phases of the desired aptitude or characteristics of the examinee may be inquired into. For example, Figure 5 illustrates some questions which may be used for determining the social phase of the examinee's aptitude. The first question or problem presented by the indicia 14 is "Do people do favors for you?" Four alternate answers are open to the examinee's suggestion such as "Few," "Some," "Many" and "Almost everyone." These alternate answers are represented by the indicia 15, 16, 17 and 18 arranged adjacent to arrow points, spots or other suitable indications of location. The examinee by turning the knob 19 directs the indicating pointer 20 to the indicia of the choice selected by him. Upon the opposite side of the panel in a corresponding local area denoted as area 13a the answer selected is recorded in a manner not observable to the examinee. The face of the panel bearing the areas 13a is positioned on the inside of the book shown in Figure 3 and thus cannot be seen by the examinee. The unobserved pointer portion 23 is moved by the turning of the knob 19 to register the chosen answer. To provide means of readily translating and recording the chosen answers suitable indicia 30, 31 and 32 are placed on the area 13a in an arced arrangement. The dot 30 in red color is an indicia of an unfavorable answer denoting the absence of a desired social phase of the examinee's aptitude. The dot 31 in white denotes a neutral position and counts neither for nor against the social phase of the examinee in this instance. The black arc 32 covering two possible answers indicates a favorable reaction and the presence of the social phase being inquired into by the particular question presented. Therefore, in this instance if the examinee turns the knob 19 to indicate his selected answer as "Many" or "Almost everyone" the indicating portion 23 will indicate the black arc 32. If the answer "Some" is selected the neutral dot 31 will be indicated. If the answer "Few" is selected, then the unfavorable dot 30 in red will be indicated.

Another illustratory question may be "Do people blame you unfairly?" The examinee similarly indicates his selected answer on the face of the panel observable to him and his choice is recorded on the face of the panel not observable to him. In this case answers corresponding with the arc 32 are considered unfavorable and therefore the arc is colored red. The answer corresponding to the dot 30 is considered favorable and therefore that dot is colored black. By a glance at the reverse face of the panel the person giving the examination may easily see the positions of the pointing portions 23 and readily determine the presence or absence of the different social phases of the aptitude desired in the examinee.

Figure 7:
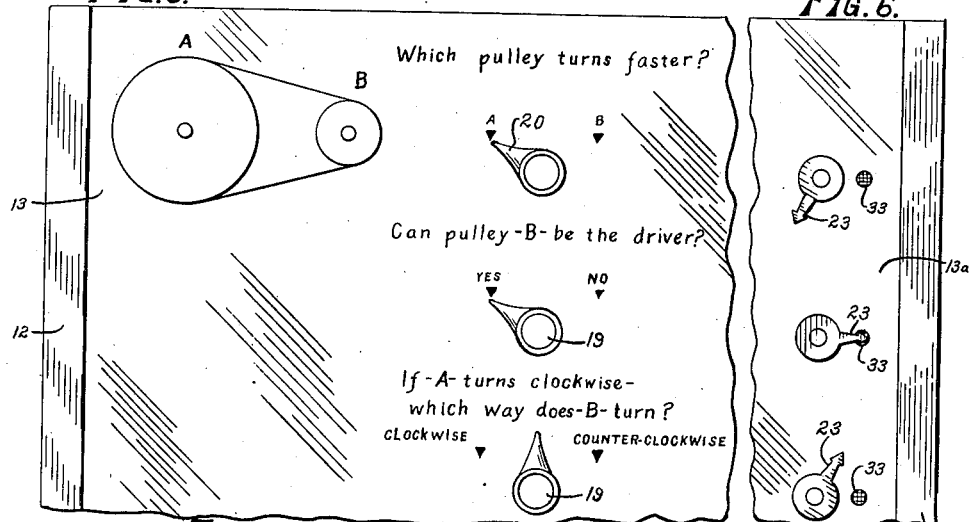
Figure 7 is another partial view of a panel embodying my device and illustrates another type of question or problem presented and the manner in which the selected answers may be indicated.

Figures 7 and 8 illustrate another type of question or problem presented to the examinee and the manner in which the answer is recorded. To determine the mechanical phase of the examinee's aptitude a mechanical problem such as two pulleys joined by a belt is presented. Different questions in connection with this general problem may then be presented in different local areas. In one local area, which may be considered as a sub-division of a larger local area, there is presented the question "Which pulley turns faster?." At another location on the face of the panel there is presented the question "Can pulley B be the driver?." Likewise the question may be presented "If A turns clockwise which way does B turn?." In each of these cases there are two alternate answers A and B. Suitable indicia illustrates the possible answers and the pointer 29 may be revolved to indicate the examinee's selected answer. To each of these questions there is only one right answer. This is designated on the opposite face of the panel by the black dot 33. When the correct answer has been selected by the examinee then the pointer portion 23 will point to the black dot 33. If an incorrect answer has been given then the pointer portion 23 will not register with the dot 33. It is noted that the pointer portions 23 and 29 do not necessarily both point in the same direction. The rigid mounting of the pointer portions 29 and 23 to the shaft 21 is such, however, that both pointer portions revolve together. By rigidly securing the pointer portion 23 at the proper position on the shaft when constructing the device the pointer portion 23 will always point to the dot 33 when a correct answer has been indicated by the examinee on the face of the panel observable to him.

Another type of question or problem presentable to an examinee to determine another phase of his aptitude, such as his knowledge of geometry and mathematics is illustrated by Figures 9 and 10. In this case a triangle having two dimensions disclosed is shown and there is presented the question "What is the length of the hypotenuse?." Four alternate answers are presented for the examinee's selection. By turning the indicating portion 29 to his selected answer there is registered on the back face of the panel the correctness or incorrectness of the answer and thus his aptitude in this particular. Since there is only one correct answer to the problem presented there is only the one dot 33 upon the back face of the panel. By glancing at the back face of the panel the person giving the examination may note the position of the indicating portion 23 and instantly determine the presence or lack of presence of this particular phase of the desired aptitude being inquired into.

The questions and problems presented here are of course merely illustratory and it is apparent that many variations and mutations may be made in the arrangements here given by way of example. By using a number of panels, many different phases of the examinee's aptitude may be inquired into for the purpose of determining the desirability of engaging the examinee for a particular position or type of work. In examining prospective factory workers the questions and problems will of course differ from those to be presented to prospectives executives. Likewise, the desired answers in one case may vary from the desired answers in another case. This is particularly true in the examination of the social phases of the aptitude of the examinee. It is apparent, however, that a very flexible and convenient arrangement is offered by the apparatus embodying my invention and that many advantages not heretofore obtainable are to be found in the use of apparatus embodying my invention.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. Apparatus for testing the particular aptitude of an examinee demonstrable from the answers to a particular group of questions or problems comprising in combination, a panel having a first surface visible to the examinee and a second surface facing in a direction opposite of said first surface, said first and second surfaces being comprised of a plurality of corresponding appropriately designated local areas, indicia carried by each of said local areas, the indicia on the local areas of the first surface representing a question or problem of said particular group of questions or problems and alternate answers to the said question or problem, the indicia on the local areas of the second surface representing indications of the degree of said particular aptitude of the examinee, a plurality of indicating members extending through said panel to rotate relative to the panel, said indicating members having pointer portions extended adjacent corresponding local areas to point to indicia on said local areas, movement of the indicating members to point the pointer portions adjacent the first surface to the indicia of the answers selected by the examinee simultaneously pointing the pointer portions adjacent the second surface to the indicia of the degree of aptitude of the examinee answering the questions or problems.

2. In apparatus of the character described, a panel having opposite surfaces, the first of the surfaces being visible to the examinee and the second of the surfaces being directed in an opposite direction, a plurality of shafts rotatably mounted in said panel at spaced distances from each other, said shafts having pointed portions rotatable therewith and positioned on opposite sides of the panel, groups of indicia positioned in juxtaposition to said shafts, respectively, on opposite sides of the panel, each group of indicia on the first of the surfaces representing alternate answers to a question or problem of a particular group of questions or problems carried by the first of the surfaces and presented to the examinee, each group of indicia on the second of the surfaces representing degrees of the presence of particular aptitude in the examinee demonstrable from the answers to said particular questions or answers, the rotating of the shafts by the examinee to indicate the selected answers translating the selected answers into indications of the said aptitude of the examinee.

3. A panel for use in examining aptitude phases of an examinee, the panel having oppositely disposed surfaces, the first of the surfaces being visible to the examinee and having particular questions or problems thereon for answering by the examinee to disclose a particular phase of said aptitude phases, groups of indicia on said first surface representing alternate answers to the questions or problems, revolvable pointers positioned in juxtaposition to said groups, respectively, of indicia on said first surface, said pointers having shafts revolvable therewith extending through the panel and having complementary pointer portions movable therewith on the second of said surfaces, indica on said second surface and not visible to the examinee representing the presence of said particular phase of said aptitude phases of the examinee, the complementary pointer portions of the revolvable pointers indicating the presence of said particular phase of said aptitude phases in accordance with the selected answers indicated by the positioning by the examinee of the revolvable pointers relative to the appropriate indicia.

4. A device for testing a particular aptitude of an examinee comprising a panel having one side visible to the examinee and an opposite side not visible to the examinee, said panel comprising a plurality of appropriately designated local areas, a first group of indicia on said one side of the panel and in each of said local areas, said group of indicia representing a question or problem adapted to make manifest said particular aptitude and selectable answers thereto, a second group of indicia on said opposite side of the panel and in each of said local areas, said second group of indicia representing indications of the presence of said particular aptitude of the examinee, a shaft rotatably mounted in each of said local areas and extending through the panel, pointer portions carried by, and rotatable with, said shaft on opposite sides of said panel, movement of a pointer portion on said one side of the panel being translated through the shaft to the other pointer portion on the opposite side of the panel, the positioning of the pointer portions on said one side of the panel to indicate the answers selected by the examinee also causing the positioning of the pointer portions on said opposite side of the panel to indicate the degree of the presence of said aptitude in the examinee.

5. A device for readily indicating a particular aptitude of an examinee by the question and answer method without disclosing the indications of aptitude to the examinee during the examination, comprising a panel having oppositely disposed faces, only one of the faces being visible to the examinee, said panel having groups of indicia distributed on the face visible to the examinee and corresponding groups of indicia distributed on the face not visible to the examinee, the indicia on the face visible to the examinee representing choices selectable by the examinee and adapted to demonstrate said particular aptitude and the indicia on the face not visible to the examinee representing translations of said choices in terms of the presence of said particular aptitude, movable first indicating means carried by the panel on the face visible to the examinee to be operated by the examinee for indicating the choices selected, complementary indicating means carried by the panel on the face not visible to the examinee and movable with said first indicating means to indicate the translations of said choices selected in terms of presence of aptitude.

6. A testing device for immediately indicating the translated interpretations of optional choices chosen by an examinee, comprising a two-faced member having one face visible to the examinee and another face directed opposite from said one face and not visible to the examinee, indicia of the said optional choices open to the examinee on said one face, indicia of the said translated interpretations on said another face, first pointer means carried by the two-faced member movable by the examinee to indicate the choices selected, and second pointer means operatively connected by mechanical means to said first pointer means to indicate the translated interpretations of the choices selected by the examinee.

7. In a system for determining the presence of a particular desired characteristic in an examinee, a plurality of indicating devices for indicating complementary phases of said desired characteristic, each of said devices having a first surface area observable to the examinee, and having a second surface area directed in a direction opposite of said first surface area and unobservable to the examinee, during the examination, said surface areas being adapted to bear visual questions presented to the examinee, the question presented for each first surface area being adapted to elicit a response relative to one of said complementary phases of the said desired characteristic, groups of indicia arranged on said first surface areas for indicating alternative answers to said questions, a movable indicator carried by each said device and adapted to be selectively pointed by the examinee to one indicia of the group of indicia on each of said first surface areas, each said indicator having a portion movable therewith extended through the respective indicating device to point on the said second surface area, groups of indicia arranged on said second surface areas for indicating degrees of the presence of said complementary phases of the said desired characteristic, the movable indicator selectively pointed by the examinee also pointing to an indicia of the group of indicia on said second surface area, the selective pointing by the examinee of the indicators to indicia on the first surface areas of the devices simultaneously pointing to the indicia on the second surface areas to register the degree of presence of the said desired characteristic.

8. In a system for determining the presence of a particular desired characteristic in an examinee, a plurality of indicating devices for indicating complementary phases relative to other complementary phases of said desired characteristic, each of said devices having a dial face visible to the examinee and a corresponding and oppositely directed dial face not visible to the examinee, indicators on said dial faces of each device connected together to move together, indicia on the dial face visible to the examinee of alternate answers to a question designed to disclose the presence of one of said phases, indicia on the corresponding dial face invisible to the examinee of the translations of said answers in terms of said complementary phases, and operating means for the moving of the indicators of the devices by the examinee to indicate selected indicia on the dial faces visible to the examinee and to simultaneously indicate corresponding indicia on the dial faces invisible to the examinee, the correspondingly indicated indicia on the dial faces invisible to the examinee disclosing the presence of the said desired characteristic in the examinee.

9. A device for translating an answer to a question posed to an examinee into an indication of a certain phase of a particular desired characteristic demonstrable by such question and answer in the examinee, comprising a pair of dial faces, one of oppositely directed said faces being visible to the examinee and the other of said faces being not visible to the examinee, a pair of indicating pointers mounted on a common shaft to move together, a first of said pointers being arranged to move adjacent the face visible to the examinee and a second of said pointers being arranged to move adjacent the face not visible to the examinee, indicia carried by the face visible to the examinee of selectable answers to a question presented to the examinee and chosen to demonstrate the degree of presence of said certain phase, and indicia carried by the face not visible to the examinee representing the degree of presence of said phase of the desired characteristic, the selected answer pointed to by the first of said pointers as moved adjacent the face visible to the examinee by the examinee being translated by the second of said pointers pointing to the indicia of the degree of presence of said phase of the desired characteristic.

JOSEPH S. KOPAS.